United States Patent [19]

Howard

[11] 4,313,059

[45] Jan. 26, 1982

[54] SEA CURRENT ENERGY SYSTEM

[76] Inventor: Gerald T. Howard, Rte. 7, Box 606, Augusta, Ga. 30906

[21] Appl. No.: 198,541

[22] Filed: Oct. 20, 1980

[51] Int. Cl.³ .............................................. F03B 13/10
[52] U.S. Cl. ........................................ 290/54; 290/43
[58] Field of Search .................................. 290/42–44, 290/53–55; 244/33, 58, 153–155

[56] References Cited

U.S. PATENT DOCUMENTS 3,887,817 6/1975 Steelman .............................. 290/43
3,987,987 10/1976 Payne et al. ......................... 290/44
4,124,182 11/1978 Loeb ..................................... 290/55

Primary Examiner—Gene Z. Rubinson
Assistant Examiner—Shelley Wade
Attorney, Agent, or Firm—Jones, Thomas & Askew

[57] ABSTRACT

A system for extracting useful energy from sea currents. A pair of drag inducing devices is disposed in the sea current, and connected by cables to a windlass at a location upstream of the drag devices. Each drag device has a selectably variable drag resistance in the sea current, and the drag devices are controlled so as to reciprocate toward and away from the upstream location. The reciprocating movement of the drag devices is converted into rotary motion by the windlass, and the rotary motion is used to perform useful work.

7 Claims, 5 Drawing Figures

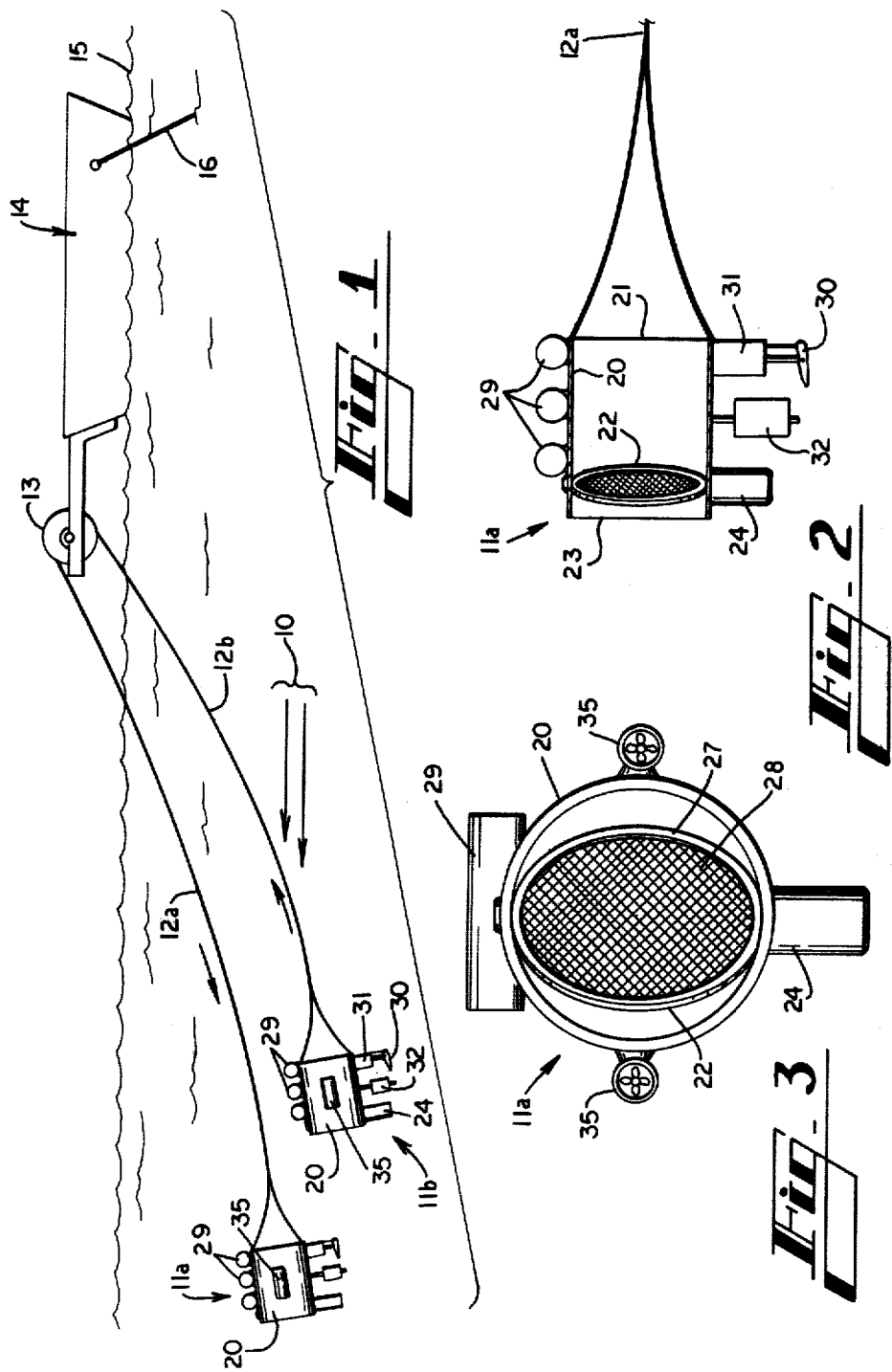

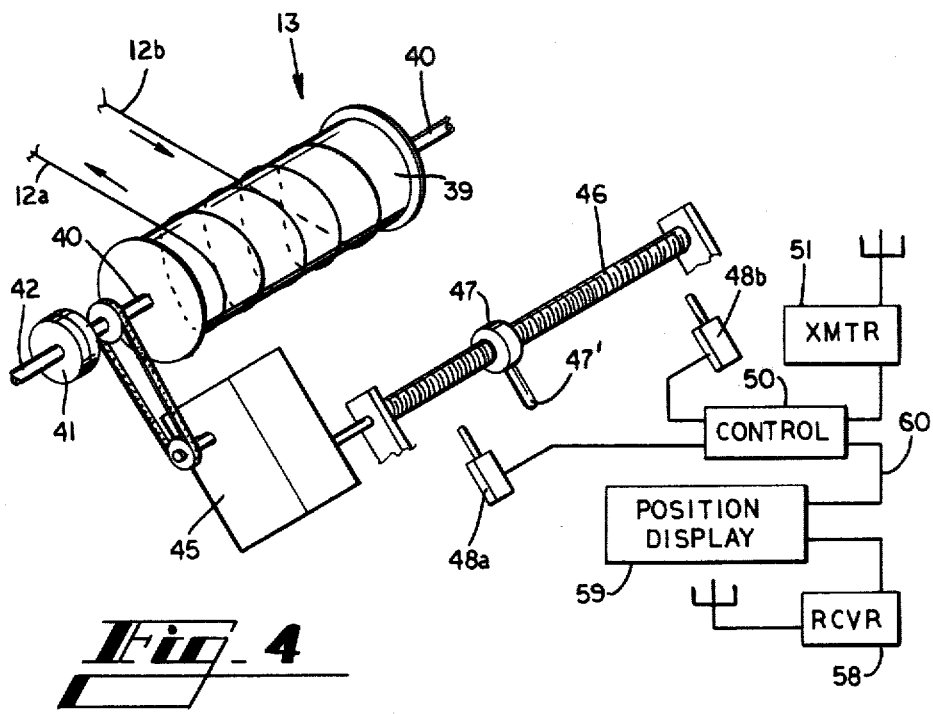
Fig_4
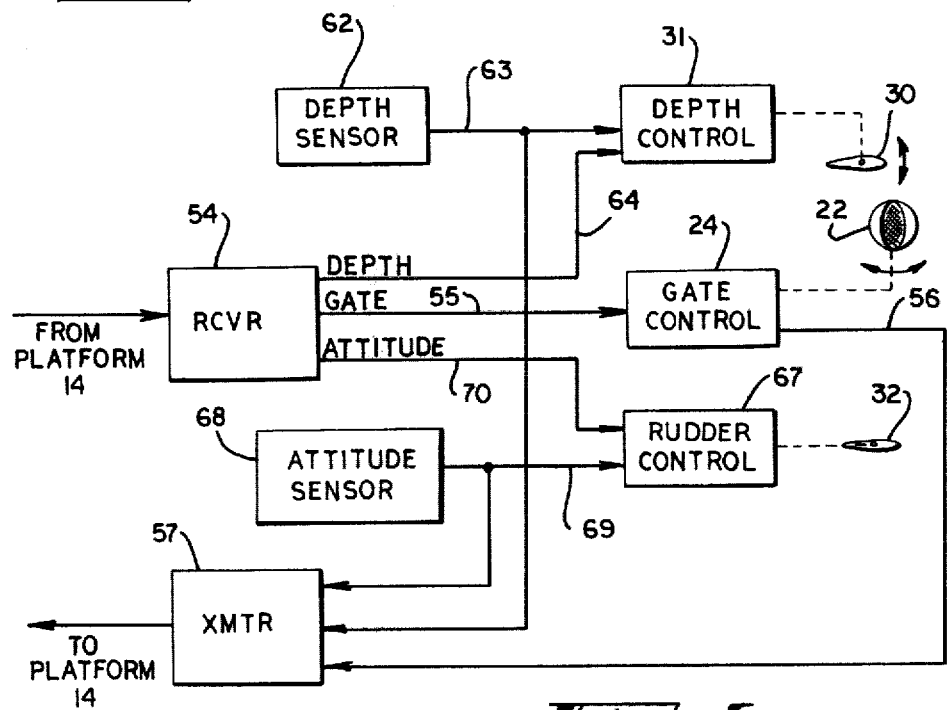
Fig_5

SEA CURRENT ENERGY SYSTEM

BACKGROUND OF THE INVENTION

This invention relates in general to an energy generating system, and in particular relates to a system for extracting usable energy from sea currents or the like.

Traditional sources of energy have largely been limited to hydrocarbon fuels and, to a lesser extent, hydroelectric power generation. The use of nuclear energy for commercial electric power generation has been used in recent years, but nuclear power is becoming increasingly controversial because of questioned reactor safety and because of controversy surrounding safe storage of the spent nuclear fuel removed from the reactors. Perhaps for the first time, people are considering the feasibility of developing alternative energy sources for practical large-scale application.

The ocean has been recognized as a potential source of energy, and many schemes have been proposed to harness that energy. For example, it has been proposed to utilize the energy present in waves, but no practical technique has been developed for dependable commercial extraction of wave energy. Moreover, ocean waves are generally subject to considerable variation in factors such as magnitude, depending on climatic conditions and other variables not under human control.

It has also been proposed to harness tidal power. Such proposals usually call for construcing a dam near the mouth of a river, or the inlet into a bay or similar enclosed region, through which a substantial tidal current ebbs and flows during the regular changes in tide. The energy contained in the tidal flow, or in the mass of water transferred by tidal action, would then be converted to electrical energy by suitable hydroelectric generation techniques. Schemes for generating tidal power necessarily are limited to producing power, or at least yielding energy for conversion into usable power, in periodic increments determined by the tide. Moreover, the possible locations for tidal-power generation are severely limited by the aforementioned geographic considerations, and also by the fact that the relatively large tides necessary for effective power generation are found only at substantial latitudes.

Accordingly, it is an object of the present invention to provide an improved system for extracting energy from the ocean.

It is another object of the present invention to provide a system using sea currents as a source of energy.

It is still another object of the present invention to provide a system for extracting useful energy from sea currents.

The foregoing and other objects of the present invention will become more readily apparent from the following discussion.

SUMMARY OF INVENTION

Stated in general terms, the system of the present invention utilizes drag means which are maintained in a sea current, and which are pulled or towed by the current relative to a stationary location. Two such drag means, each having selectably variable drag resistance in the sea current, are provided in conjunction with a reciprocating interconnection at the stationary location. One of the drag means is adjusted to have substantially greater drag resistance than the other drag means, so that the one drag means is moved by the ocean current away from the fixed location. The force of the first drag means is operated through the reciprocal interconnection to move the other drag means toward the stationary location, in opposition to the current. The force of the sea current acting on the first drag means, in excess of the amount required to move the other drag means toward the stationary location, represents the useful work output of the present system, and may be utilized in any suitable manner.

Stated somewhat more specifically, each drag means is connected to the stationary location by a cable, which may comprise a single cable wound around a windlass or the like. Whatever the mode of interconnection at the stationary location, the effective drag resistance of each drag means is reversed approaching one half-cycle of reciprocation, so that the drag means formerly of lesser resistance now commences to be pulled downstream by the sea current, and returns the other drag means toward the stationary location.

BRIEF DESCRIPTION OF DRAWINGS

FIG. 1 is a partially schematic view illustrating the disclosed embodiment of the present invention.

FIG. 2 is a partially-sectioned elevation view of one of the sea drags.

FIG. 3 is an end view of the sea drag shown in FIG. 2, taken from the back end thereof.

FIG. 4 is a pictorial view illustrating the windlass drive arrangement at the stationary location, in the disclosed embodiment.

FIG. 5 is a schematic view of the control apparatus associated with a typical sea drag.

DISCLOSURE OF PREFERRED EMBODIMENT

Turning first to FIG. 1, there is shown an embodiment of the present sea current energy system for extracting usable energy from a sea current indicated by the arrows 10. Those skilled in the art will recognize that such sea currents have certain characteristics, among which are a known rate of flow and direction of travel. A typical example of a sea or ocean current is the Gulf Stream, which travels along a generally established path around the Florida peninsula and then along a northerly path up the Atlantic coast of North America. Sea currents of interest in the system of the present invention typically flow at a rate of two to four knots, for example, along a course which remains generally unaffected by short-term climatic conditions or other phenomena affecting the surface of the sea.

Disposed in the path of the current 10 are a pair of sea drag mechanisms 11a and 11b, which are hereafter simply called "drags." Each of the drags 11a and 11b is tethered by a corresponding cable 12a and 12b, and the cables extend upstream to a cable winding device 13 in the nature of a windlass, supported on the platform 14. The platform 14 is depicted in FIG. 1 as being a barge-like vessel floating on the surface 15 of the water, and tethered by an anchor chain 16 extending downwardly to a bottom-engaging anchor (not shown). The purpose of the platform 14 is to provide a stationary location relative to the sea current 10, and so it will be apparent that the platform 14 could alternatively be a fully-submerged vessel or structure so as to be isolated from waves and other surface activity, and to be removed from possible interference with marine traffic. The platform 14, whatever its nature, is disposed in vertical alignment with a previously-identified location of the sea where the sea currents 10 of known direction and desired speed exist. If the platform 14 is submerged to lie within the stratum making up the sea current, it is preferable that the external configuration of the platform be streamlined so as to present minimum drag, and therefore to reduce the anchor requirements of the platform.

The two drags 11a and 11b may be structurally identical, and a typical drag 11a is show in greater detail in FIGS. 2 and 3. The drags 11a and 11b are similar, in basic function, to the so-called "sea-anchor" frequently used as a source of drag to stabilize ships during the era of sail. Such traditional sea anchors could include any object which presented a sizable cross-section area in the water, so that the sea anchor acting against the water exerted a drag force helping hold a ship in check against the forces of high winds or surface currents.

The present drags 11a and 11b functionally differ from a traditional sea anchor in several important aspects: the drags of the present invention have a selectably variable drag force, or resistance to the flowing sea current 10; and these drags are selectively movable in the sea current relative to the stationary position of the platform 14. For example, when the drag 11a has maximum drag resistance and the drag 11b has minimum resistance, the drag force exerted on cable 12a is greater than the drag force exerted on cable 12b. These unequal forces act on the windlass 13 in a manner described below, so that the cable 12a is extended from the platform 14 while the cable 12b is retracted toward the platform against the lesser drag force of the drag 11b. These movements of the two drags 11a and 11b, denoted by the arrows alongside the cables 12a and 12b, continue until the inbound drag 11b approaches a predetermined proximity to the platform 14, at which time the relative drag effects of the two drags become reversed as described below. The drag resistance of drag 11b then becomes greater than the resistance of drag 11a, so that the current 10 will pull the drag 11b outwardly and away from the platform 14 while the drag 11a is towed upstream toward the platform. This reciprocating motion of the two drags continues as long as the drags are maintained in the sea current 10 and the respective drag resistances are periodically reversed. The towing force exerted by the outbound drag, in excess of the force required to retract the inbound drag, may be coupled from the windlass for performing useful work, and amounts to energy extracted from the sea current 10.

Each of the drags 11a and 11b, as typified by the drag 11a shown in FIGS. 2 and 3, may have a generally cylindrical housing 20 open at its front end 21, and has a movable drag-adjusting gate 22 disposed within the hollow cylindrical housing adjacent the back end 23. The gate 22 in the present embodiment is in the nature of a butterfly valve member pivotably mounted within the cylindrical housing 20, and coupled to a gate control 24 including a motor. The gate 22 is shown partly-open in FIG. 3; this gate normally assumes either a fully-open position in which the gate offers minimum resistance to the current 10, or a maximum-resistance position in which the gate closes the back end 23 of the cylindrical housing 20 and maximizes resistance to the sea current.

The cylindrical housing 20 of each drag 11a and 11b is preferably constructed of an open framework for maximum structural strength while keeping down the overall weight of the drag, covered with a mesh or net material defining the cylindrical surface to induce drag relative to the moving sea current 10. The structural frame and the mesh cover, as well as other components of the drag, obviously must be of a corrosion-resistant material such as stainless steel, aluminum, or the like, in view of their long-term exposure to sea water.

The gate 22 may be constructed in a manner similar to the cylindrical housing, having a structural peripheral frame 27 enclosing an opening covered with drag-inducing mesh 28. The gate area covered by the mesh 28 may also be structurally reinforced by bracing members (not shown) to provide sufficient resistance to the force exerted by the sea current when the gate is in its closed or maximum-drag position.

Each of the drags 11a and 11b should preferably exhibit near-neutral buoyancy so as to be more easily positionable within the current 10, and for that purpose one or more flotation chambers 29 are affixed to the top of each drag. The drags also are equipped with a movable horizontal vane 30 (FIG. 2) acting as an elevator to control the vertical position of the drag within the sea. The elevator vane 30 is operated by a depth control mechanism 31 carried by the drag, and described below in greater detail.

Each drag may also be equipped with a vertical vane 32 (FIG. 2) pivotable on a vertical axis, and functioning as a rudder to control the lateral position of the drag within the sea. The operation of the rubber vane 32 is also described below.

In order to supply each drag with sufficient power for operating the gate control 24, as well as the elevator and rudder vanes and related equipment, each drag is equipped with one or a pair of water-driven turbines 35, shown in FIG. 3 as being symmetrically mounted on the exterior of the cylindrical housing 20. The force of sea current 10 flowing past each drag drives the turbine(s) 35 and a suitable generator to maintain charge in a suitable battery (not shown) connected to provide electrical power for apparatus on board the drag. The construction and arrangement of a battery charging and power distribution circuit is well within the skill of the art, and need not be described herein in greater detail.

Turning next to FIG. 4, details of the windlass 13 and related apparatus carried on the platform 14 are shown. The windlass 13 includes a cable-winding cylindrical drum 39 supported by an axle 40 suitably mounted for rotation. The cable 12a connected to the drag 11a enters the drum 39, and makes several passes about the drum before departing the drum as the cable 12b extending to the other drag 11b. It is thus seen that the two cables 12a and 12b, in the disclosed embodiment, constitute a single length of cable whose two ends are connected to the two drags, and which engages the windlass drum 39 so that, for example, movement of the cable 12a away from the drum causes the other cable 12b to be drawn toward the drum. The terms "winding" and "unwinding" thus refer to the functions of retracting or extending the cables 12a and 12b relative to the fixed platform 14, rather than being limited to winding or unwinding separate individual cables on separate drums.

Rotation of the windlass drum 39 is coupled through a clutch 41 to drive the output shaft 42, which may be connected to any suitable work-receiving mechanism. For example, the output shaft 42 may be directly connected to an electrical generator or alternator, so that rotation of the output shaft by the windlass drum 39 generates electrical power. Because the rotation of the output shaft 42 periodically reverses, and the rotational speed of the shaft decreases as the reversal points are approached, it may be preferable to connect the output shaft 42 to drive a power accumulator, which in turn can supply a relatively steady-state drive to a generator or the like. One example of a suitable power accumulator includes a hydraulic pump connected to be driven by the output shaft 42, and an appropriate hydraulic pressure accumulator connected to provide buffer storage of hydraulic energy during the transition of rotation by the windlass drum 39.

The shaft 40 of the drum 39 is also coupled through a reduction drive 45 to operate a drag position sensing device such as the threaded screw 46. The screw 46 is suitably mounted for rotation, and is engaged by a nonrotating follower 47 which moves from left to right (or vice versa) as the screw 46 turns in response to rotation of the windlass drum 39. A pair of limit switches 48a and 48b are positioned to be actuated by the arm 47' of the follower, at the opposite ends of follower movement on the screw 46.

The length and pitch of the screw 46, along with the reduction ratio of the reduction drive 45, are chosen so that the follower 47 actuates one of the limit switches 48a, 48b when the inbound drag (11b, for example) approaches maximum desirable proximity to the platform 14, and the follower actuates the other limit switch when the other drag 11a approaches maximum proximity during reciprocal movement of the drags. Actuation of the limit switches 48a and 48b under control of the windlass-driven screw 46 thus provides signals for controlling the operation of the gate 22 on each drag.

Signals from the limit switches 48a and 48b go to the control unit 50, which operates to activate a suitable signal transmitter 51 for sending a control signal receivable by complementary apparatus on board each of the drags 11a and 112b. Although it may be possible in some applications to utilize transmitting apparatus operating in the electromagnetic spectrum, it is known that sea water attenuates radio signals and it may be desirable or necessary to utilize ultrasonic transmitting and receiving apparatus as the signalling link between the platform 14 and the drags 11a and 11b. Those skilled in the art will appreciate that the transmitter 51, whether emitting radio signals or ultrasonic signals, provides a carrier wave which is modulated in response to information being transmitted from the platform 14 to the drags 11. When one of the limit switches 48a or 48b is actuated by the follower 47, the control unit 50 thus encodes that signal in modulation suitable for the transmitter 51. It is preferred that digitally encoded signals be transmitted between the platform 14 and the drags, and the nature and construction of suitable data transmission and encoding apparatus will be apparent to those skilled in the art.

FIG. 5 shows signal receiving and utilizing apparatus associated with each of the drags, as well as apparatus for returning supervisory signals to the platform 14. Located on board each of the drags 11a and 11b is a receiver 54 which receives signals from the platform-located transmitter 51. The gate control signals or other data signal from the transmitter are detected, and the gate control signals are supplied on line 55 to the gate control apparatus 24. The gate control 24 operates in response to a gate control signal to reverse the previous position of the gate 22, so that the effective drag resistance of the particular drag is reversed. Considering the configuration shown in FIG. 1 when a gate control signal is received in response to the drag 11b reaching its fully retracted positiond and the drag 11a simultaneously reaching its maximum extended position downstream from the platform, the control signals received by the drags cause the gate of drag 11b to close and cause the gate of drag 11a to open. The actual position of the gate 22 on each drag is monitored by the gate control 24, and a gate position signal is supplied along the line 56 to the transmitter 57 on board each drag. This actual gate position signal is returned to the platform 14 via the transmitter 57 and the receiver 58 on board the platform, to provide as an appropriate indication on the position display apparatus 59. An operator on the platform 14 thus can constantly monitor the actual gate position of each drag, to make certain each gate follows its commanded position. The position display apparatus preferably also receives gate command signals on the line 60 from the control unit 50, for comparison purposes.

Returning to FIG. 5, it is seen that the position of the rudder 30 on each drag is maintained in the response to the depth control apparatus 31. The depth of the drags 11a and 11b beneath the water surface 15 is normally maintained at a desired predetermined depth, determined by the depth of the sea current 10 and by the need for the two drags to pass each other without physical interference midpoint between extension and retraction. The actual depth of the drag beneath the surface 15 is determined by a suitable depth sensor 62. A depth signal is supplied along line 63 to the depth control 31, which also receives a depth command signal from the control unit 50 on the platform, by way of transmitter 51, receiver 54, and depth command signal line 64. The depth control 31 senses the difference, if any, between the depth command signal on line 64 and the measured depth signal on line 63, and drives the position of the elevator 30 as necessary to adjust the depth of the drag. It should be apparent from the foregoing that the drags 11a and 11b may operate at different depths, on receipt of appropriate command signals from the platform 14.

The position of the rudder 32 on each drag 11a and 11b is controlled by the rudder control apparatus 67 in a manner similar to the elevator 30. The actual azimuth attitude of each drag is measured by an attitude sensor 68 such as a compass or the like, which may be mounted on a stable platform of conventional design so as to be unaffected by possible rolling motion of the drag. The attitude sensor 68 supplies an attitude signal along line 69 to the rudder control apparatus 67. An attitude command signal received from platform 14 is supplied to the rudder control apparatus 67 along the attitude signal command line 70, from the receiver 54. The position of rudder 32 is controlled by differences between the actual signal and command signal on lines 69 and 70, respectively, so as to maintain the desired command attitude of the drag. As with the depth, it will be apparent that the attitude of each drag 11a and 11b may be sufficiently different to maintain desired lateral separation between the two drags.

The operation of the foregoing sea current energy system should now be apparent from the foregoing description. The drags 11a and 11b trail the platform 14 in the sea current 10, and reciprocate between minimum and maximum downstream positions as the drag resistance of each drag is alternated. This reciprocal motion drives the windlass 13, and energy exceeding that required to retract the low-resistance drag is extracted from the windlass through the output shaft 42. This extracted work may be converted to electrical power as pointed out above, and the electrical power can be transferred to shore via submerged transmission cable for use. Alternatively, the electrical power developed at the platform 14 can be converted to chemical energy by electrolizing water (in abundant supply at the platform), thereby converting the water to gaseous hydrogen and oxygen. These gases, or at least the combustible hydrogen gas, are collected for shipment to a remote point of use.

It should also be apparent that the foregoing relates to but a disclosed embodiment of the present invention, and that numerous changes and modifications may be made therein without departing from the spirit or scope of the invention as defined in the following claims.

I claim:

1. System for extracting energy from in a water current, comprising:
   first drag means operative to present a selectably variable drag resistance in the current;
   second drag means operative to present a selectably variable drag resistance in the current;
   drive means located upstream of said drag means and connected to each of said drag means so that movement of one drag means away from said location causes movement of the other drag means toward said location, and vice versa;
   drag control means operative to select the drag resistance of each drag means so that the drag force of the current on one drag means is greater than the drag force of the current on the other drag means, whereby the current urges said one drag means away from said drive means and the other drag means is moved toward said drive means in opposition to the current;
   work receiving means operatively associated with said drive means to be driven in response to the drag force of the current on said one drag means exceeding the drag force of the current on said other drag means;
   first cable means extending between said first drag means and said drive means to transfer the drag force of the first drag means to said drive means;
   second cable means extending between said second drag and said drive means to transfer the drag force of the second drag means to said drive means;
   said drive means is operatively associated with said first and second cable means to retract the cable means having lesser drag force in response to extension of the cable means having greater drag force;
   said first and second cable means comprising a continuous cable interconnected between said first and second drag means; and
   said drive means operatively engages said continuous cable to retract the cable connecting to the drag means having lesser drag force as the cable connecting to the drag means having greater drag force is extended.

2. The system as in claim 1, further comprising:
   means responsive to the movement of said first and second drag means to provide a control signal when a predetermined extent of movement occurs; and
   said drag control means is responsive to said control signal to reverse the drag resistance of said first and second drag means, thereby causing the drag force of the current on said other drag means to exceed the drag force of the current said one drag means so that the other drag means now is moved away from said drive means location by the current and said drive means moves said one drag means toward said location against the current flow.

3. The system as in claim 2, wherein:
   each of said drag means includes a drag member selectably movable either to a position of greater drag resistance or to a position of lesser drag resistance; and
   means operative in response to said control signal to place said drag members in opposed positions so that the drag forces exerted on said driving means by the two drag means are unequal, thereby driving said driving means and said operatively associated work receiving means.

4. System as in claim 3, wherein
   said means for providing said control signal is responsive to said drive means; and said drag control means comprises
   signal sending means at said upstream location and operative to send signals to said drag means; and
   signal receiving means at each of said drag means and responsive to said signals from said sending means to command said drag members to said opposed positions.

5. The system as in claim 1, wherein said drive means is stationary at said upstream location, relative to the current.

6. The system as in claim 1, wherein:
   said drive means comprises a windlass; and
   said first and second cable means wind on said windlass so that the cable means having greater drag force operates said windlass to retract the cable means having lesser drag force.

7. System for extracting energy from in a water current, comprising:
   first drag means operative to present a selectably variable drag resistance in the current;
   second drag means operative to present a selectably variable drag resistance in the current;
   drive means located upstream of said drag means and connected to each of said drag means so that movement of one drag means away from said location causes movement of the other drag means toward said location, and vice versa;
   drag control means operative to select the drag resistance of each drag means so that the drag force of the current on one drag means is greater than the drag force of the current on the other drag means, whereby the current urges said one drag means away from said drive means and the other drag means is moved toward said drive means in opposition to the current;
   work receiving means operatively associated with said drive means to be driven in response to the drag force of the current on said one drag means exceeding the drag force of the current on said other drag means;
   first cable means extending between said first drag means and said drive means to transfer the drag force of the first drag means to said drive means;
   second cable means extending between said second drag and said drive means to transfer the drag force of the second drag means to said drive means;
   said drive means is operatively associated with said first and second cable means to retract the cable means having lesser drag force in response to extension of the cable means having greater drag force;
   said drive means comprising a windlass;

said first and second cable means wind on said windlass so that the cable means having greater drag force operates said windlass to retract the cable means having lesser drag force; and said first and second cable means comprise a continuous cable interconnected between said first and second drag means, and wound about said windlass.

* * * * *